United States Patent

Ronai et al.

[15] 3,640,729
[45] Feb. 8, 1972

[54] INSTANT OAT CEREAL PRODUCT

[72] Inventors: Kenneth S. Ronai, Ridgewood; Henry C. Spanier, Dumont, both of N.J.

[73] Assignee: Nabisco, Inc., New York, N.Y.

[22] Filed: May 8, 1969

[21] Appl. No.: 823,156

[52] U.S. Cl. ..................................................99/83
[51] Int. Cl. ...................................................A23l 1/10
[58] Field of Search ......................................99/80, 83

[56] References Cited

UNITED STATES PATENTS

| | | | |
|---|---|---|---|
| 2,864,702 | 12/1958 | Murray et al. | 99/80 |
| 2,999,018 | 9/1961 | Huffman et al. | 99/83 |
| 3,520,695 | 7/1970 | Hanser et al. | 99/83 |

Primary Examiner—Raymond N. Jones
Attorney—I. Allen Strombeck

[57] ABSTRACT

An instant oat cereal product, requiring no cooking comprising processed oats and an edible cereal hydrolysate texturizing agent with a Dextrose Equivalent or from about 6 to about 12 and a process for its preparation.

10 Claims, No Drawings

INSTANT OAT CEREAL PRODUCT

BACKGROUND OF THE INVENTION

This invention relates to an instant oat cereal product. More specifically, this invention relates to an instant oat cereal product with desirable flavor and aroma which forms a ready-to-eat oatmeal upon the addition of hot or boiling water without any cooking required.

Oatmeal is one of the most popular hot cereals, however, in many homes and public dining places it is not served due to the considerable time required for its preparation and the subsequent cleaning of the preparation utensils. Furthermore, once prepared the oatmeal has poor keeping qualities and tends to become pasty and undesirable in a short period of time. Quick-cooking oat cereals have been developed but these still require a cooking time of, e.g., from 1–6 minutes, to obtain an acceptable oatmeal.

The cereal art has long sought an oat cereal product which could be employed to prepare an acceptable oatmeal without any cooking. Many attempts have been made to obtain such an instant oatmeal product and some such products are presently available to the consumer. The biggest problem has been in obtaining a product with satisfactory flavor, aroma and texture characteristics. Murray et al., U.S. Pat. No. 2,864,702 issued Dec. 16, 1958, discloses a process for making a toasted oat flake product said to be capable of producing oatmeal upon the addition of boiling water. Rutgers et al., U.S. Pat. No. 2,928,743, issued Mar. 15, 1960, discloses another process for preparing a flaked cereal product said to be capable of thickening upon the addition of liquid thereto and immediately suitable for consumption without cooking. Huffman et al., U.S. Pat. No. 2,999,018 issued Sept. 5, 1961, discloses an instant-type food product which upon the addition of boiling water and without further heating is said to form a product with the flavor and texture characteristics of cooked oatmeal. This product consists essentially of quick-cooking rolled oats and from 0.1 to 1.0 percent by weight of the rolled oats of a polysaccharide gum. Generally, the products of the above patents and other similar products have been found very different in flavor, mouth feel, appearance, stability and consistency from the conventional hot oat cereals which require at least some cooking.

It is, therefore, a primary object of the present invention to provide an instant oat cereal product which overcomes all the foregoing disadvantages.

It is a further object to provide an instant oat cereal product which forms a desirable ready-to-eat oatmeal composition without any cooking required.

It is a still further object of the present invention to provide an instant oat cereal product which consists essentially of processed oats and an edible cereal hydrolysate texturizing agent.

Other objects and advantages of the present invention will be apparent to one skilled in the art from the following description.

SUMMARY OF THE INVENTION

The objects of the present invention are achieved by an instant oat cereal product comprising, in essential proportions, a mixture consisting of (A) processed oats and (B) an edible cereal hydrolysate texturizing agent. The process of the present invention comprises the treating of whole oat groats to form the desired oat flakes and blending these processed oat flakes with an edible cereal hydrolysate texturizing agent with a Dextrose Equivalent of from about 6 to about 12 to form the desired product. Upon the addition of hot or boiling water to the compositions of this invention an oatmeal results with the flavor, mouth feel, appearance, stability and consistency found only in fully cooked cereals.

The processed oats useful in the present invention are prepared from whole oat groats. Oat groats are the kernel product resulting from the cleaning and drying of oats which removes the hulls. The whole oat groats are toasted, pearled and cut into a number of pieces. The pieces are hydrated, steamed and flaked and the flakes are subsequently dried to the desired moisture content.

The whole oat groats after cleaning are subjected to a toasting treatment until the whole oat groats have reached a temperature of from about 225° F. to about 315° F., preferably from about 275° F. to about 285° F. and a moisture content of from about 2 percent to about 8 percent, preferably from about 4.5 percent to about 6 percent. This toasting treatment is used to develop flavor and can occur in any commercially available hot air oven or dryer or other suitable available apparatus. The toasting step occurs in a period of from about 4 minutes to about 120 minutes, preferably from about 15 to about 25 minutes. During the toasting treatment the whole oat groats are continually agitated in order to prevent overtreating of any particular portion of the oat groats. After the toasting treatment is completed, the oat groats must be cooled rapidly to below 150° F. in order to stop the toasting operation and prevent overtoasting.

The cooled, toasted oat groats are then pearled to remove the outer layer (sometimes called the pericarp) of the oat groats. The pearling of the oat groats can be performed by any well-known and commercially available abrasive roll. The abrading of the oat groat causes the outer layer to separate from the remainder of the oat groat resulting in a weight loss of from about 4 percent to about 12 percent by weight of the total oat groat.

The toasted, pearled oat groats are then cut and sifted through a 7 mesh screen of 0.110-inch opening and over a 14 mesh screen of 0.0555-inch opening. The groats retained by the 7 mesh screen are recut and then sifted through and the throughs of the 14 mesh screen are not further used in this process. A sufficient amount of water is then added to the cut and sifted oats to raise the moisture content to from about 9 percent to about 12 percent.

The hydrated oats are then put through a tempering treatment, i.e., they are permitted to stand at a temperature of from about 65° F. to about 85° F. preferably about 75° F. for a period of from about 30 minutes to about 90 minutes, preferably about 60 minutes. This tempering step takes place in hermetically tight bins or other suitable apparatus and permits the moisture content to be distributed uniformly throughout the oats. It also improves the resiliency of the oats and makes them more suitable for flaking.

After the tempering treatment oats are steamed prior to being flaked. The steaming process is desirable as a means of reducing the amount of fines and breakages in the flaked product. The oats are heated utilizing steam at a temperature of from about 190° F. to about 210° F., preferably about 205° F. for a period of time of from about 2 minutes to about 5 minutes, preferably about 3 minutes. The oats then have a moisture content of from about 13 percent to about 16 percent, preferably about 15 percent.

The hot, steamed oats are then fed to the conventional flaking rolls and equipment where they are flaked to a bulk density of from about 26 to about 28 grams per 100 cc., preferably about 26.5 grams per 100 cc. and a thickness of from about 0.009 inch to about 0.015 inch. To achieve the desired bulk density and thickness the surface temperature of the flaking rolls should be maintained in the range of about 180° F. to about 200° F. Thereafter, if necessary, the oat flakes are dried to reduce the moisture content to about 7 percent to 13 percent, preferably 9 percent to 12 percent.

The edible cereal hydrolysate texturizing agents useful in the present invention are the reaction products of a partially completed hydrolysis of a cereal starch. Corn is the preferred cereal starch utilized to form the cereal hydrolysate texturizing agents of the present invention.

The hydrolysis reaction converts the starch first to a polysaccharide and if allowed to proceed to completion to a monosaccharide or simple sugar. In order to form the cereal hydrolysate texturizing agents of the present invention the reaction is not allowed to go to completion. Any of a wide variety of acids will effect the conversion although hydrochloric acid is generally utilized in these reactions.

Starch hydrolysates, as the products of hydrolysis are called, are classified by their "Dextrose Equivalent" or "D.E." value. This designation is a measure of the reducing-sugar content calculated as anhydrous dextrose and expressed as a percentage of the total dry substance. Cereal hydrolysate texturizing agents useful in the present invention should have D.E. values of from about 6 to about 12, preferably from about 9 to about 11. The cereal hydrolysate texturizing agents of the present invention are substantially bland in character and thus do not affect the flavor or sweetness level of the resulting product. Specific cereal hydrolysate texturizing agents useful in the present invention include a product sold by Grain Processing Corporation of Muscatine, Iowa, under the trademark "DMD-10" and a product sold by Corn Products Company, Englewood Cliffs, New Jersey, under the trademark "Mor-Rex." Other cereal hydrolysate texturizing agents meeting the above requirements can also be utilized in the present invention.

The processed oats of the present invention are present from about 85 percent to about 98 percent, preferably from about 88 percent to about 95 percent, by weight of the total composition. If more than about 98 percent by weight of the total composition is utilized then an undesirable gruel results upon the addition of water. If less than about 85 percent by weight of the total composition is utilized reconstitution becomes a problem upon the addition of water.

The cereal hydrolysate texturizing agents of the present invention are present from about 2.0 percent to about 5.0 percent, preferably about 2.25 percent to about 2.5 percent by weight of the total composition. If more than about 5.0 percent by weight of the total composition is added, there will be no advantages achieved. If less than about 2.0 percent by weight of the total composition is added the desired advantages of this invention will not be achieved, i.e., the addition of a hot liquid will result in a pasty gruel rather than the desired oatmeal.

Miscellaneous materials such as sugar, salt, other flavoring agents, minerals, vitamins, freeze dried fruits, oils, butylated hydroxytoluene and other materials which are well-known as constituents in cereal formulations and which are compatible in the formulations of the present invention can also be present in minor amounts.

The various constituents of the instant oat cereal compositions of the present invention can be admixed in any manner and sequence to achieve the desired objects as stated above. It is preferred, however, for ease of formulation to add any optional components, e.g., salt and vitamins, to the cereal hydrolysate texturizing agent and then add this mixture to the processed oats.

The following examples will illustrate in detail the manner in which the invention can be practiced. It will be understood, however, that the invention is not confined to the specific limitations set forth in the individual examples but rather to the scope of the appended claims.

PREFERRED EMBODIMENTS

EXAMPLE I

Ten pounds of oat groats were placed in a Jabez Burns Roaster (manufactured by Jabez Burns & Sons, New York) at a temperature of about 270° F. for a period of about 20 minutes to toast the oat groats. The toasted oat groats were then cooled to a temperature of about 150° F. The oats were then pearled utilizing a Satake Rice Machine Type RM abrasive roller (manufactured by Satake Engineering Co. Ltd., Tokyo, Japan) and then cut on a Kipp Kelly Rotary Granulator, Model STD, Size 1 (manufactured by Kipp Kelly Ltd. Winnipeg, Canada) and sifted. Only the cut oat groats retained on a 14 mesh screen with a 0.0555-inch opening were retained with the fines being discarded. Two hundred and eighty milliliters of water were added to raise the moisture content to about 10 percent and the hydrated oats were tempered at room temperature (about 72° F.) for a period of about 1 hour in a sealed container. The oats were then placed in a 10 quart modified Hobart Bowl Steam Injection Agitator Kettle at 196° F. and steamed for a period of about 3 minutes. The oats were then placed in a Lauhoff Model NSP-10 flaking roll (manufactured by Lauhoff Roller Mill Works, Detroit, Michigan) whereby 8.35 pounds of oat flakes were obtained. These processed oats were dried to a moisture content of about 10 percent and blended at a regulated rate with 0.21 pounds of DMD-10 to form the desired product as follows:

|                       | % by weight |
|-----------------------|-------------|
| Processed oat flaked  | 95.4        |
| DMD-10                | 2.4         |
| Salt                  | 2.2         |
|                       | 100.00      |

[1] as hereinbefore defined.

A portion of the resulting product was reconstituted by the addition of two-thirds of a cup of boiling water with mixing. The reconstituted product was then submitted to a test panel and the consensus of opinion was that the taste, texture and aroma characteristics were those of a desirable oat cereal product.

EXAMPLE II

An instant oat cereal product as follows was prepared according to the process of Example I.

|                       | % by weight |
|-----------------------|-------------|
| Processed oat flaked  | 95.4        |
| DMD-10                | 2.4         |
| Salt                  | 2.2         |
|                       | 100.00      |

A portion of the product was reconstituted and submitted to a test panel as in Example I. The consensus of opinion was that the taste, texture and aroma characteristics were those of a desirable oat cereal product.

EXAMPLE III

An instant oat cereal product as follows was prepared according to the process of Example I.

|                          | % by weight |
|--------------------------|-------------|
| Processed Oats           | 91.19       |
| DMD-10[1]                | 2.32        |
| Salt                     | 2.40        |
| Minerals (Iron)          | 0.15        |
| Wheat Germ Vitamin Mix   | 2.56        |
| Butylated Hydroxytoluene | 0.02        |
| Sugar                    | 1.36        |
|                          | 100.00      |

[1] as hereinbefore defined.

A portion of the product was reconstituted and submitted to a test panel as in Example I. The consensus of opinion was that the taste, texture and aroma characteristics were those of a desirable oat cereal product.

When in Example III an equal amount by weight of "Mor-Rex" is substituted for "DMD-10" substantially equivalent results are obtained in that upon reconstitution the resulting product has taste, texture and aroma characteristics that are desirable in an oat cereal product.

In addition to the preferred embodiments described herein, other arrangements and variations within the scope and spirit of the invention and the appended claims will occur to those skilled in the art.

What is claimed is:

1. An instant oat cereal product consisting essentially of from about 85 percent to about 98 percent by weight processed oats prepared by the steps of:
   A. toasting whole oat groats at a temperature of from about 225° F. to about 315° F. for a period of from about 4 minutes to about 120 minutes and subsequently cooling to below 150° F.;
   B. pearling said toasted whole oat groats;
   C. cutting and sifting said toasted, pearled whole oats groats through a 7 mesh screen of 0.110-inch opening and over a 14 mesh screen of 0.0555-inch opening;
   D. hydrating said oats by the addition of water to a moisture content of from about 9 percent to about 12 percent;
   E. tempering said oats at a temperature of from about 65° F. to about 85° F. for a period of from about 30 minutes to about 90 minutes;
   F. steaming said oats at a temperature of from about 190° F. to about 210° F. for a period of from about 2 minutes to about 5 minutes; and
   G. flaking and drying said oats to a moisture content of from about 7 percent to about 13 percent and from about 2.0 percent to about 5.0 percent by weight of an edible cereal hydrolysate texturizing agent with a Dextrose Equivalent of from about 6 to about 12 which upon the addition of hot or boiling water forms a ready-to-eat oatmeal without any cooking required.

2. The instant oat cereal product of claim 1 wherein the edible cereal hydrolysate texturizing agent has a Dextrose Equivalent of from about 9 to about 11.

3. The instant oat cereal product of claim 1 wherein the processed oats are present from about 88 percent to about 95 percent by weight.

4. The instant oat cereal product of claim 2 wherein the edible cereal hydrolysate texturizing agent is present from about 2.25 percent to about 2.50 percent by weight.

5. A process for the production of an instant oat cereal product which upon the addition of hot or boiling water forms a ready to eat oatmeal without any cooking required which consists essentially of the steps of:
   A. toasting whole oat groats at a temperature of from about 225° F. to about 315° F. for a period of from about 4 minutes to about 120 minutes and subsequently cooling to below 150° F.;
   B. pearling said toasted whole oat groats;
   C. cutting and sifting said toasted, pearled whole oat groats through a 7 mesh screen of 0.110-inch opening and over a 14 mesh screen of 0.0555-inch opening;
   D. hydrating said oats by the addition of water to a moisture content of from about 9 percent to about 12 percent;
   E. tempering said oats at a temperature of from about 65° F. to about 85° F. for a period of from about 30 minutes to about 90 minutes;
   F. steaming said oats at a temperature of from about 190° F. to about 210° F. for a period of from about 2 minutes to about 5 minutes;
   G. flaking and drying said oats to a moisture content of from about 7 percent to about 13 percent; and
   H. blending said processed oats with from about 2 percent to about 5 percent by weight of an edible cereal hydrolysate texturizing agent with a Dextrose Equivalent of from about 6 to about 12.

6. The process of claim 5 wherein said toasting is at a temperature of from about 275° F. to about 285° F.

7. The precess of claim 5 wherein said toasting is for a period of from about 15 minutes to about 25 minutes.

8. The process of claim 5 wherein said tempering is at a temperature of about 75° F. for a period of about 60 minutes.

9. The process of claim 5 wherein said steaming is at a temperature of about 205° F. for a period of about 3 minutes.

10. The process of claim 5 wherein the blending is with about 2.5 percent by weight of an edible cereal hydrolysate texturizing agent with a Dextrose Equivalent of from about 9 to about 11.

* * * * *